United States Patent [19]
Plett et al.

[11] 3,717,038
[45] Feb. 20, 1973

[54] DIRECT CURRENT PRESSURE RATIO CIRCUIT

[75] Inventors: Don A. Plett, Cincinnati; Louis L. Owen, West Chester; Robert H. Tenkman, Cincinnati, all of Ohio

[73] Assignee: General Electric Company

[22] Filed: April 30, 1971

[21] Appl. No.: 139,050

[52] U.S. Cl. .................73/398 AR, 73/115, 73/182
[51] Int. Cl. .................................................G01l 9/02
[58] Field of Search ...73/182, 407 PR, 398 AR, 147, 73/115; 235/196; 330/30

[56] References Cited

UNITED STATES PATENTS

| | | | |
|---|---|---|---|
| 3,443,080 | 5/1969 | Spencer | 235/196 |
| 2,905,385 | 9/1959 | Larse | 235/196 |
| 3,528,022 | 9/1970 | Adams | 330/30 D |
| 3,548,662 | 12/1970 | Brandau et al. | 73/398 AR |

Primary Examiner—Donald O. Woodiel
Attorney—Derek P. Lawrence, Thomas J. Bird, Jr., Lee H. Sachs, Frank L. Neuhauser, Oscar B. Waddell and Joseph B. Forman

[57] ABSTRACT

An electrical circuit is disclosed which provides an output which indicates the ratio of a sensed pressure differential to a sensed absolute pressure and thereby approximates the Mach number of air flow in a duct. A pair of transducers respectively sense the differential between total and static pressure, and static pressure, per se, in the duct. The pressure differential signal provides an input to an operational amplifier circuit, while the absolute pressure signal forms part of a feedback loop to the operational amplifier. A non-linear compensation network is provided to prevent null drift of the operational amplifier.

8 Claims, 3 Drawing Figures

PATENTED FEB 20 1973 3,717,038

INVENTORS.
DON A. PLETT
LOUIS L. OWEN
ROBERT H. TENKMAN

T. J. Bird, Jr
AGENT.

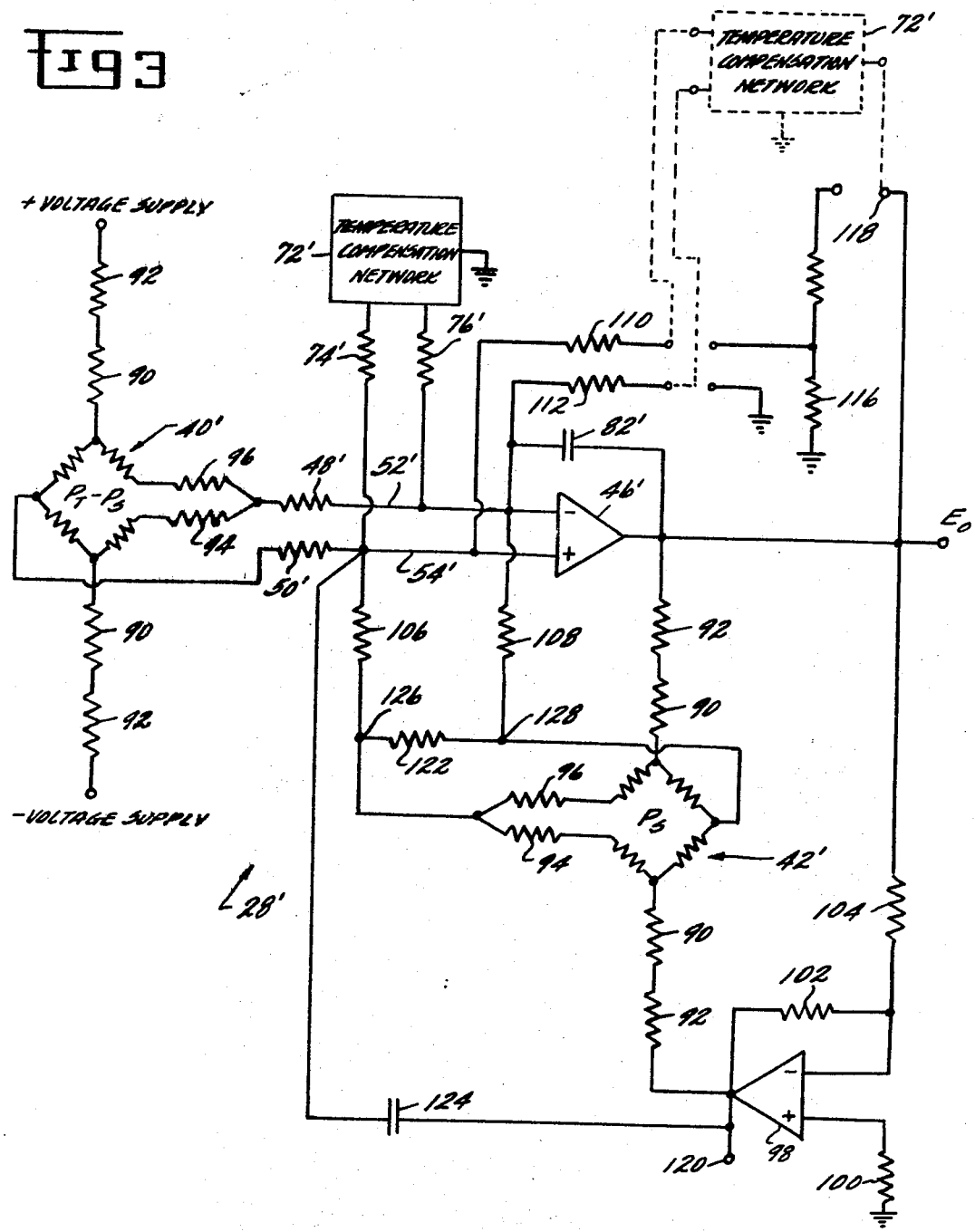

DIRECT CURRENT PRESSURE RATIO CIRCUIT

BACKGROUND OF THE INVENTION

The present invention relates generally to improvements in electrical circuitry adapted to provide an output indicative of the ratio of two inputs and, more particularly, to circuitry adapted to provide an output indicative of the Mach number of gases flowing through a duct.

The present invention further relates to improvements in electrical circuitry of the type shown in U.S. Pat. No. 3,433,080 issued to W. R. Spencer and assigned to the same assignee of the present application. As described in the Spencer patent, one parameter of gas turbine engine performance is the rate of flow of gases through the engine as measured in terms of Mach number. It has long been established that the Mach number (M) at any point in a flow field can be expressed in terms of the difference between total gas pressure ($P_t$) and static gas pressure ($P_s$) divided by the static gas pressure as follows:

$$[1+(\gamma-1)/2\, M^2](\gamma)/(\gamma^{-1})-1 = (P_t - P_s)/P_s$$

where $\gamma$ (gamma) equals the specific heat at constant pressure divided by the specific heat at constant volume. By measuring the total and static pressures, the Mach number can thus be calculated and employed in either engine control or in the instrumentation for the engine.

Pressure measurements, per se, present no problem and may be made in many ways. For present purposes it is desired that such measurements be made by means which develop electric signals proportionate to the sensed pressure. Actually, and preferably, transducers are employed to obtain two electric signals, one proportionate to static pressure ($P_s$) and the other proportionate to the difference between total pressure and static pressure ($P_t - P_s$). The problem which faces the designer is that of taking the input signals provided by the transducers and providing an accurate electrical signal which is a function of the air flow in the gas turbine engine or, in other words, of providing an accurate electrical signal which is a function of the pressure ratio $(P_t - P_s)/P_s$.

The dividing circuit shown in the Spencer patent provided such a function, but was somewhat complicated and costly in that it required a number of accurately wound transformers. In addition, the Spencer circuitry was basically an alternating current device, whereas the remaining portions of most engine control systems are primarily direct current devices. The alternating current excitation of the Spencer circuit requires additional power supply circuitry and the output thereof must be demodulated because the control system operates on d.c. signals.

SUMMARY OF THE INVENTION

It is an object of the present invention, therefore, to provide a simple and reliable, d.c.-actuated, electrical circuit which will provide an accurate electrical signal which is a function of the air flow in the duct (gas turbine engine).

Briefly stated, the above object is achieved by providing an electrical circuit in which a pressure transducer which senses static pressure forms part of a feedback loop to an operational amplifier. The output from a second transducer, which senses total pressure minus static pressure, forms the primary input to the operational amplifier circuitry. In addition, non-linear compensation which corrects for null drift of the circuitry is provided.

DESCRIPTION OF THE DRAWINGS

While the specification concludes with a series of claims which particularly point out and distinctly claim the subject matter which Applicants regard as their invention, a complete understanding of the invention will be had from a reading of the following description given in connection with the accompanying drawings, in which:

FIG. 3 is a schematic of an alternative embodiment.

DESCRIPTION OF A PREFERRED EMBODIMENT

While the circuitry described herein has broad applicability to any environment in which a ratio output signal is desired, it will be described in connection with an application wherein an output signal indicative of the Mach number of flow in a gas turbine engine is generated. This description is intended in no way to limit the broader applicability of Applicants' device.

Figure 1:
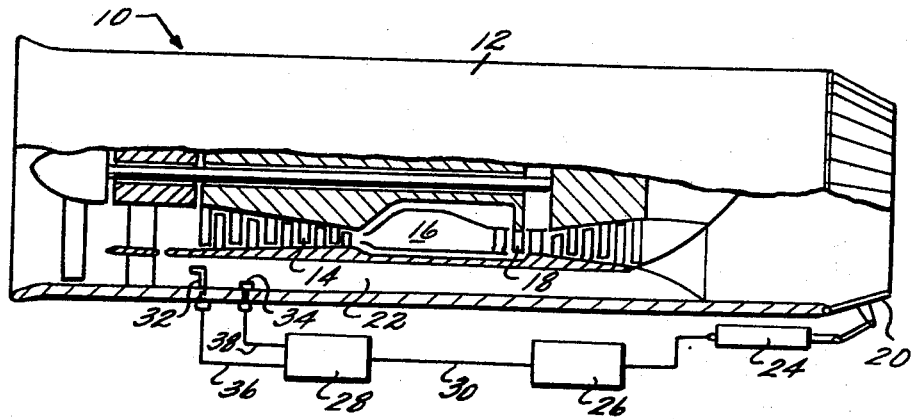
FIG. 1 is a schematic, partially sectional view, of a gas turbine engine incorporating the present invention.

Referring to FIG. 1, a gas turbine engine 10 of the turbofan type is shown to include a casing 12, a compressor 14, a combustion system 16, a turbine 18, and an exhaust nozzle 20. The duct 12 forms a bypass passageway 22 which surrounds the compressor 14, the combustion system 16 and the turbine 18.

The problem which led to the development of the electrical circuitry described herein is that of providing an accurate electrical signal which is a function of the air flow within the passageway 22. This air flow is an important control parameter and is used to regulate the area of the exhaust nozzle 20 to maintain a constant flow for each throttle setting of the gas turbine engine 10. For this purpose, the exhaust nozzle 20 is provided with a plurality of actuators 24 (only one of which is shown) which are mechanically connected to the exhaust nozzle 20 to vary the exit area thereof.

The actuators 24 may be of any known type, for example hydraulic pistons, and are controlled by means of electro-mechanical control shown schematically at 26. As previously described, one of the inputs to the control 26 is the Mach number of the flow in the passageway 22. For this reason, a fan duct Mach sensor or pressure ratio circuit 28 is connected to the casing 12 in any suitable manner and provides an input to the control 26 as shown schematically by line 30. As has been previously described, the Mach number at any point in a duct is a unique function of the ratio of the total pressure minus the static pressure to the static pressure. For this reason, the Mach number sensor 28 is provided with a total pressure probe 32 and a static pressure probe 34 which are connected to the Mach sensor 28 by means of conduits 36 and 38, respectively.

Figure 2:
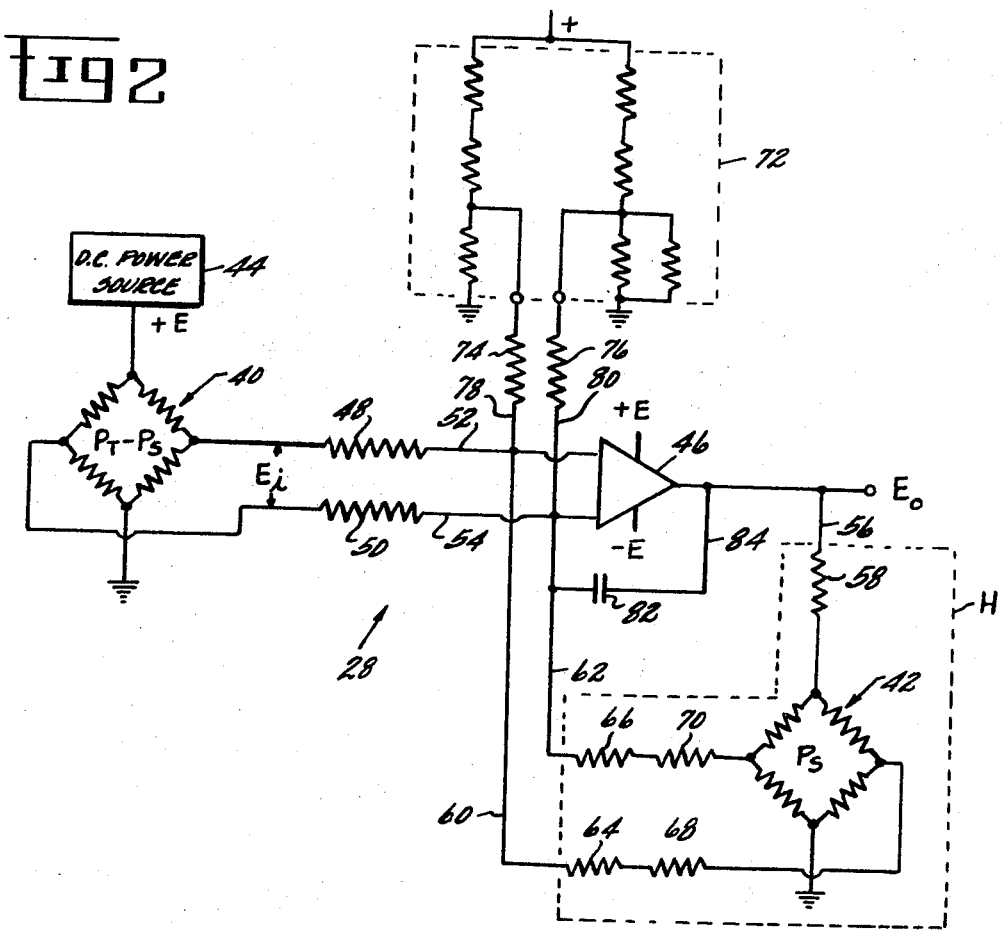
FIG. 2 is a schematic of the circuitry for the present invention.

Referring now to FIG. 2, the electrical circuitry which makes up a portion of the Mach sensor 28 is shown. The signals generated by the pressure probes 32 and 34 are imposed on a pair of pressure transducers 40 and 42, respectively. The pressure transducers 40 and 42 may be of any known type and are represented in FIG. 2 as four element Wheatstone resistance bridges. Experimentation with the circuitry described herein has shown that thin film strain gages are preferable to other types of transducers. In addition, the transducer 40 is preferably a differential transducer which measures the difference between total pressure and static pressure, while the transducer 42 is preferably an absolute pressure transducer which measures static pressure. As an alternative, an absolute pressure unit to measure total pressure could replace the transducer 40. A differential transducer was selected, however, because a smaller range transducer, which reduces system error, could thus be used.

Connected across the transducer 40 is a direct current voltage source 44. The signal generated by the transducer 40 provides an input signal ($E_i$) to an operational amplifier 46. The input signal is imposed on the operational amplifier 46 through a matched pair of resistors 48 and 50 by means of lines 52 and 54.

The output of the operational amplifier 46 is used to excite the transducer 42 by means of a line 56. The signal is imposed on the transducer 42 through a resistor 58. The output of the transducer 42 is connected to the lines 52 and 54 by means of lines 60 and 62, respectively, which contain a matched pair of resistors 64 and 66. A second pair of resistors 68 and 70 are connected in series with the resistors 64 and 66. The transducer 42 thus forms a portion of a feedback loop (elements 56 through 70) for the operational amplifier 46.

As further shown in FIG. 2, a non-linear compensation network, generally designated by the numeral 72, forms an additional input to the operational amplifier 46 through resistors 74 and 76 by means of lines 78 and 80. The non-linear compensation network 72 is described in detail in U. S. Pat. No. 3,528,022 issued to M. M. Adams and assigned to the same assignee as the present application. As described in the Adams patent, the network 72 comprises a bridge network which is formed by a combination of resistors which respectively vary in a non-linear function over a given temperature range and have a constant resistance value over the temperature range. The output of this resistance network is a variable voltage output which is applied to the bases of a pair of transistors in the amplifier 46 and provides temperature compensation to the amplifier 46 to minimize "null drift" over a given temperature range. In other words, the network 72 maintains the null or zero balance of the circuit 28 at $P_t = P_s$ over a broad temperature range, e.g., minus 65°F to plus 250°F. In addition to the temperature compensation network 72, a capacitor 82 is parallel-connected to the amplifier 46 by means of line 84 to provide frequency compensation of the amplifier 46.

Referring still to FIG. 2, the matched pair of resistors 48 and 50 and the matched pair of resistors 64 and 66 set the basic gain of the overall system, while the resistors 58 and 70 are selected to trim the desired system gain to produce full scale output at $E_0$ at the maximum expected pressure ratio of ($P_t-P_s/P_s$ or $P_t/P_s$. The resistor 68 is preferably temperature sensitive and its value is chosen to compensate the zero pressure offset voltage of the transducer 42 and thus maintain the gain of the system constant over the expected temperature range. The value of the resistors in the compensation network 72 are chosen with the actual temperature null shift of the amplifier 46 as a basis for calculation as described in the Adams patent.

As mentioned above, an output signal $E_0$ is desired which represents $P_t-P_s/P_s$. This output signal has been achieved by placing the $P_s$ transducer 42 in the feedback loop of the operational amplifier 46, as described above. The relationship can be described mathematically beginning the well known equation for the gain of the amplifier 46:

$$E_o/E_i = G/(1+GH)$$

where $E_O$ equals output voltage, $E_i$ equals input voltage, $G$ equals open loop amplifier gain, and H equals the feedback ratio. From the above $$E_O = E_iG/(1+GH)$$

in the present system, H is proportional to the pressure used in the feedback path, i.e., $P_s$; and the open loop amplifier gain $G$ is very high compared to 1. As previously described, $E_i$ is proportional to ($P_t-P_s$). Therefore the following relationship exists:

$$E_0 = ((P_t-P_s)(G))/(1+(G)(P_s))$$

If $G$ is high compared to 1 then, $$E_0 = ((P_t-P_s)(G))/(P_s)(G)) = (P_t-P_s)/P_s$$

Thus, the desired relationship is attained.

Referring now to FIG. 3, an alternative embodiment of the Mach sensor 28 is shown and generally labeled 28'. The Mach sensor 28' is identical in most respects to the Mach sensor 28 and corresponding elements thereof are given like numerals followed by a prime designation. In this respect, signals generated by suitable pressure probes are imposed on a pair of pressure transducers 40' and 42', which may be of any known type and which are represented as four element Wheatstone resistance bridges. The transducers 40' and 42' are excited by a positive and negative voltage equal in magnitude through temperature compensating resistors 90 and dropping resistors 92, which reduce loading of the amplifiers, and reduce self heating of the transducers 40' and 42'. Ideally, the transducers 40' and 42' are specified such that the bridge output voltages thereof are close to circuit common potential thereby eliminating a common mode signal. The transducers 40' and 42' are additionally supplied with temperature compensating resistors 94 and zero balance resistors 96 as shown in FIG. 3.

The output of the transducer 40' is connected through a matched pair of resistors 48' and 50' to an operational amplifier 46' by means of lines 52' and 54', respectively. As in the prior case, the null drift of the amplifier 46' and residual offset drift of $P_t-P_s$ transducer 40' is controlled by means of a temperature compensation network 72' which is connected to lines 52' and 54' through a matched pair of resistors 74' and 76'.

With the transducer 40' energized by a constant voltage source and pressures applied to the pressure probes, a signal proportional to the difference in pressures ($P_t-P_s$) is amplified by the amplifier 46'. The output of the amplifier 46' is inverted by means of a circuit consisting of a second amplifier 98 and resistors 100, 102 and 104, where resistors 102 and 104 are matched.

The output of the amplifiers 46' and 98 thus energize the transducer 42' to produce an electrical signal which is proportional to the product of the energizing voltage and the sensed pressure. This signal is fed back through a matched pair of resistors 106 and 108 to the input of the amplifier 46' such that the resulting signal from the amplifier 46' is proportional to $(P_t-P_s)/P_s$ The small zero pressure offset voltage of the transducer 42' is directly compensated for by means of a matched pair of resistors 110 and 112 along with resistors 114 and 116 as shown in FIG. 3. In applications where the offset voltage of the transducer 42' drifts badly with temperature, the resistors 114 and 116 may be replaced with a second temperature compensation network 72' as shown in phantom in FIG. 3. In such a case, the network 72' may be connected to a terminal 118 and/or to a terminal 120, as required.

The matched pair of resistors 48' and 50', along with the matched pair of resistors 106 and 108 are selected to set the electrical gain of the overall system, while a resistor 122 is connected between nodes 126 and 128 to provide a gain trimming function. As in the prior case, capacitors 82' and 124 provide frequency compensation for the amplifier 46'.

The significant difference and advantage of the embodiment shown in FIG. 3 over that described in connection with FIG. 2 is that the inverter amplifier 98 eliminates the common mode output voltage of the transducer 42'. This eliminates possible inaccuracies due to mismatch of the matched pairs of resistors shown in the circuit. In addition, the zero pressure offset voltage of the transducer 42' is directly compensated in the embodiment shown in FIG. 3.

Having above described one embodiment of the invention, though not exhaustive of all possible equivalents, what is desired to be secured by Letters Patent is claimed below.

We claim:

1. An electrical circuit comprising:
   amplifier means having a gain ($G$) and providing an output signal ($E_0$),
   means for providing an input signal ($E_i$) to be amplified by said amplifier means,
   means for providing a feedback signal ($H$) to said amplifier means,
   said input signal generating means including a first pressure transducer such that ($E_i$) is proportional to a first pressure level and said feedback signal generating means including a second pressure transducer such that ($H$) is proportional to a second pressure level whereby said output signal is proportional to the ratio of said first pressure level divided by said second pressure level, and
   said signal feedback generating means including means for compensating for the zero pressure offset voltage of said second pressure transducer.

2. An electrical circuit as recited in claim 1 wherein said feedback signal generating means further includes means for inverting the output signal of said amplifier means and for applying the inverted signal to said second pressure transducer.

3. An electrical circuit as recited in claim 2 wherein said first pressure transducer is a pressure differential sensor and said second pressure transducer is an absolute pressure level sensor.

4. An electrical circuit as recited in claim 3 further including means for minimizing null drift of said amplifier means.

5. An electrical circuit for indicating the Mach number of flow within a duct comprising:
   amplifier means having a gain ($G$) and providing an output signal ($E_0$),
   means connected to said amplifier means for generating an input signal ($E_i$) to be amplified by said amplifier means, said input signal generating means providing a signal proportional to the difference between the total pressure and the static pressure within said duct,
   means connected to said amplifier means for generating a feedback signal ($H$) therefor, said feedback signal being proportional to the static pressure within said duct whereby said output signal is proportional to the ratio of said differential signal divided by said static pressure signal
   said input signal generating means including a pressure transducer subjected to said differential pressure signal and said feedback signal generating means including a pressure transducer subjected to said static pressure signal, and
   said feedback signal generating means including means for compensating for the zero pressure offset voltage of said static pressure signal transducer.

6. An electrical circuit as recited in claim 5 further including means for minimizing null drift of said amplifier means.

7. An electrical circuit as recited in claim 6 wherein said feedback signal generating means further includes means for inverting the output signal of said amplifier means and for applying the inverted signal to said second pressure transducer.

8. An electrical circuit as recited in claim 7 wherein said duct comprises a portion of a gas turbine engine.

\* \* \* \* \*